United States Patent
Wu et al.

(10) Patent No.: US 10,523,060 B2
(45) Date of Patent: Dec. 31, 2019

(54) POWER SUPPLYING DEVICE, WIRELESS POWER TRANSMISSION SYSTEM WITH POSITIONAL ADJUSTMENT AND METHOD THEREOF

(71) Applicants: Jiuen-Ying Wu, New Taipei (TW); Chih-Hung Huang, New Taipei (TW)

(72) Inventors: Jiuen-Ying Wu, New Taipei (TW); Chih-Hung Huang, New Taipei (TW)

( * ) Notice: Subject to any disclaimer, the term of this patent is extended or adjusted under 35 U.S.C. 154(b) by 60 days.

(21) Appl. No.: 15/581,250

(22) Filed: Apr. 28, 2017

(65) Prior Publication Data

US 2017/0317535 A1    Nov. 2, 2017

Related U.S. Application Data

(60) Provisional application No. 62/329,658, filed on Apr. 29, 2016.

(30) Foreign Application Priority Data

Oct. 17, 2016 (TW) .............................. 105133456 A

(51) Int. Cl.
| | |
|---|---|
| *H02J 50/90* | (2016.01) |
| *H02J 50/40* | (2016.01) |
| *H02J 50/20* | (2016.01) |
| *H02J 50/30* | (2016.01) |
| *H02J 50/00* | (2016.01) |
| *H02J 50/80* | (2016.01) |

(52) U.S. Cl.
CPC .............. *H02J 50/40* (2016.02); *H02J 50/00* (2016.02); *H02J 50/20* (2016.02); *H02J 50/30* (2016.02); *H02J 50/80* (2016.02); *H02J 50/90* (2016.02)

(58) Field of Classification Search
CPC .................................. H02J 50/00; H04B 5/00
USPC .......................................................... 307/104
See application file for complete search history.

(56) References Cited

U.S. PATENT DOCUMENTS

| | | | | |
|---|---|---|---|---|
| 5,617,003 A | * | 4/1997 | Odachi ................. | B60L 11/182 320/108 |
| 5,654,621 A | * | 8/1997 | Seelig ................... | B60L 11/182 320/108 |
| 5,821,731 A | * | 10/1998 | Kuki .................... | B60L 11/1805 320/108 |
| 2007/0279002 A1 | * | 12/2007 | Partovi ................. | H02J 7/0027 320/115 |

(Continued)

*Primary Examiner* — Adi Amrany
(74) *Attorney, Agent, or Firm* — Muncy, Geissler, Olds & Lowe, P.C.

(57) ABSTRACT

A wireless power transmission system is provided, which includes a power supplying device and a power receiving device. The power supplying device electrically connects to an outside supply terminal and has a wireless transmission module. The power receiving device has a wireless receiving module. Wherein, the power supplying device connects to the wireless receiving module via the wireless transmission module and transmits a power from the outside supply terminal to the power receiving device, after the power supplying device detects the wireless receiving module via the wireless transmission module. Alternatively, after the power receiving device detects the wireless transmission module via the wireless receiving module, the power receiving device connects to the wireless transmission module via the wireless receiving module so as to receive the power transmitted by the power supplying device.

11 Claims, 10 Drawing Sheets

(56) References Cited

U.S. PATENT DOCUMENTS

| | | | | |
|---|---|---|---|---|
| 2009/0286476 | A1* | 11/2009 | Toncich | G06K 7/0008 |
| | | | | 455/41.1 |
| 2011/0254503 | A1* | 10/2011 | Widmer | B60L 11/182 |
| | | | | 320/108 |
| 2012/0323423 | A1* | 12/2012 | Nakamura | B60L 11/123 |
| | | | | 701/22 |
| 2014/0361735 | A1* | 12/2014 | Li | H02J 7/025 |
| | | | | 320/108 |
| 2015/0204928 | A1* | 7/2015 | Hoover | H02J 7/025 |
| | | | | 320/108 |
| 2017/0001532 | A1* | 1/2017 | Taniguchi | B60L 11/1831 |
| 2017/0064635 | A1* | 3/2017 | Tanabe | H02J 7/0047 |

* cited by examiner

When the at least one power receiving device is judged as conforming to the certification procedure via the at least one power supplying device, the at least one power supplying device is electrically and wirelessly connected to the wireless receiving module via the wireless transmission module, so as to transmit the electric power of the outside supply terminal to the at least one power receiving device ⌒S31A

FIG. 8

POWER SUPPLYING DEVICE, WIRELESS POWER TRANSMISSION SYSTEM WITH POSITIONAL ADJUSTMENT AND METHOD THEREOF

CROSS-REFERENCE TO RELATED APPLICATION

This application claims priority from the U.S. Provisional Application No. 62/329,658 filed on Apr. 29, 2016 at the USPTO, and Taiwan Patent Application No. 105133456 filed on Oct. 17, 2016 at the Taiwan Intellectual Property Office, the content of which is hereby incorporated by reference in its entirety for all purposes.

BACKGROUND OF THE INVENTION

1. Field of the Invention

The present invention is related to a power transmission apparatus, and, more specifically, related to a power supplying device, wireless power transmission system and method thereof which may have the technical features of automatic alignment and wirelessly supplying power.

2. Description of the Related Art

As the development of technologies, a variety of household electric appliances are fully around us in modern lives. Since each of the household electric appliances needs to be connected to the power source via plugging the power source line thereof into the power source socket so as to operate, the power source line thereof would probably affect the circumferential beauty. Besides, if the power source line is too short or the power source socket is too far to be reached, the extension wire will be essential under these conditions, so that making the surrounding messed up by miscellaneous wirings.

In summary of the statements above, the inventor of present disclosure diligently designed the power supplying device, wireless power transmission system and method thereof, for expectantly directing to the issue of prior arts to improve, and further enhancing the industrial applicability thereof.

SUMMARY OF THE INVENTION

According to the issue of the prior arts described above, the purpose of present disclosure is about providing a power supplying device, wireless power transmission system and method thereof, so as to solve the existing issue of prior arts.

According to the purpose of the present disclosure, the wireless power transmission system is provided, which includes a power supplying device and a power receiving device. At least one power supplying device is electrically connected to an outside supply terminal and has a wireless transmission module. At least one power receiving device has a wireless receiving module. Wherein, when the wireless receiving module is detected by the at least one power supplying device via the wireless transmission module, the at least one power supplying device is electrically and wirelessly connected to the wireless receiving module via the wireless transmission module, and transmitting electric power from the outside supply terminal to the at least one power receiving device; or, when the wireless transmission module is detected by the at least one power receiving device via the wireless receiving module, the at least one power receiving device is electrically and wirelessly connected to the wireless transmission module via the wireless receiving module, and receiving electric power transmitted by the at least one power supplying device.

Preferably, when the wireless receiving module is detected by the wireless transmission module or the wireless transmission module is detected by the wireless receiving module, and the at least one power supplying device judges the at least one power receiving device as conforming to a certification procedure, the at least one power supplying device is electrically and wirelessly connected to the wireless receiving module via the wireless transmission module, so as to transmit electric power from the outside supply terminal to the at least one power receiving device.

Preferably, when the wireless receiving module is detected by the wireless transmission module or the wireless transmission module is detected by the wireless receiving module, and the wireless transmission module receives a request signal transmitted by the wireless receiving module, the at least one power supplying device conducts a positioning operation according to the request signal, and is electrically and wirelessly connected to the wireless receiving module via the wireless transmission module, so as to transmit a predetermined electric power to the at least one power receiving device.

Preferably, when the wireless receiving module is detected by the wireless transmission module or the wireless transmission module is detected by the wireless receiving module, and the wireless transmission module receives a request signal transmitted by the wireless receiving module, the at least one power supplying device generates a control signal according to the request signal, and transmitting the control signal to the wireless receiving module, so as to make the at least one power receiving device conduct a displacement operation according to the control signal while the at least one power supplying device conducts a positioning operation according to the request signal; and the at least one power supplying device is electrically and wirelessly connected to the wireless receiving module via the wireless transmission module, so as to transmit a predetermined electric power to the at least one power receiving device.

Preferably, the power supplying device may comprise a driving module, a power receiving module, a wireless transmission module and a processing module. The power receiving module is located at the driving module and receives electric power from the outside supply terminal. The wireless transmission module searches and detects the wireless receiving module within a predetermined range. The processing module is electrically connected to the power receiving module, the driving module and the wireless transmission module, and making the driving module drive the wireless transmission module to conduct a displacement along a predetermined displacement trajectory. Wherein when the wireless receiving module is detected by the wireless transmission module within the predetermined range, the processing module would accordingly control the wireless transmission module to electrically and wirelessly connect to the wireless receiving module, and subsequently, electric power is transmitted to the wireless receiving module via the wireless transmission module.

According to the purpose of the present invention, it further provides a wireless power transmission method, which is applied to the wireless power transmission system, and the wireless power transmission method comprises steps as follows:

detecting the wireless receiving module via the wireless transmission module, or detecting the wireless transmission module via the wireless receiving module;

when the wireless receiving module is detected by the wireless transmission module, the at least one power supplying device is electrically and wirelessly connected to the wireless receiving module via the wireless transmission module, or when the wireless transmission module is detected by the wireless receiving module, the at least one power receiving device is electrically and wirelessly connected to the wireless transmission module via the wireless receiving module; and the at least one power supplying device transmits electric power from the outside supply terminal to the at least one power receiving device.

Preferably, the step that the wireless receiving module is detected by the wireless transmission module or the wireless transmission module is detected by the wireless receiving module further comprises a step as follows:

when at least one power receiving device is judged as conforming to a certification procedure by the at least one power supplying device, the at least one power supplying device is electrically and wirelessly connected to the wireless receiving module via the wireless transmission module, so as to transmit electric power from the outside supply terminal to the at least one power receiving device.

Preferably, the step that the wireless receiving module is detected by the wireless transmission module or the wireless transmission module is detected by the wireless receiving module further comprises steps as follows:

a request signal from the wireless receiving module is transmitted to the wireless transmission module;

a positioning operation is conducted by the at least one power supplying device according to the request signal; and the wireless receiving module is electrically and wirelessly connected to the wireless transmission module, so as to transmit a predetermined electric power to the at least one power receiving device.

Preferably, the step that the wireless receiving module is detected by the wireless transmission module or the wireless transmission module is detected by the wireless receiving module further comprises steps as follows:

a request signal from the wireless receiving module is transmitted to the wireless transmission module;

a control signal is generated by the at least one power supplying device according to the request signal and transmitted to the wireless receiving module, so as to make the at least one power receiving device conduct a displacement operation according to the control signal, and utilize the at least one power supplying device to conduct a positioning operation according to the request signal; and the wireless transmission module is utilized to electrically and wirelessly connect to the wireless receiving module, so as to transmit a predetermined electric power to the at least one power receiving device.

According to the purpose of the present invention, it further provides a power supplying device, which comprises: a driving module, a power receiving module, a wireless transmission module and a processing module. The power receiving module is located at the driving module and receives electric power from the outside supply terminal. The wireless transmission module detects at least one power receiving device within a predetermined range. The processing module is electrically connected to the power receiving module, the driving module and the wireless transmission module, and making the driving module drive the wireless transmission module to conduct a displacement along a predetermined displacement trajectory. Wherein when the at least one power receiving device is detected by the wireless transmission module within the predetermined range, the processing module would accordingly control the wireless transmission module to electrically and wirelessly connect to the at least one power receiving device, and subsequently, electric power is transmitted to the at least one power receiving device via the wireless transmission module.

Preferably, the driving module may comprise an assembly main body, a guiding assembly, a linking-up assembly and a driving assembly. One end of the assembly main body is connected to the power receiving module. The guiding assembly is suspended from the assembly main body, and has at least one guiding groove. The linking-up assembly is interposed at the at least one guiding groove, wherein one end of the linking-up assembly can movably be connected to the other end of the assembly main body, the other end of the linking-up assembly is connected to the processing module, and the wireless transmission module is located at the processing module. The driving assembly is electrically connected to the processing module, and movably connected to an outer edge of the guiding assembly. Wherein the processing module makes the driving assembly drive the guiding assembly to conduct a rotation, the linking-up assembly is subsequently moved along the predetermined displacement trajectory via the at least one guiding groove so as to drive the processing module to conduct the displacement, and the wireless transmission module is further driven to conduct the displacement in the predetermined range and detect the at least one power receiving device. Besides, when the at least one power receiving device is detected by the wireless transmission module, the processing module would transmit electric power to the at least one power receiving device via the wireless transmission module.

To sum up, in accordance with the power supplying device, the wireless power transmission system and the applied method thereof, via configuring the power supplying device at the outside supply terminal and configuring the power receiving device at the electric appliances, the wireless transmission module of the power supplying device and the wireless receiving module of the power receiving device or combinations thereof may be utilized to conduct searching and detecting, and when the aforementioned modules are detected by each other, the wireless electrical connection would be established so as to supply the electric power, such that capable of achieving the convenience of power supplying and solving the problem that all the known power supplying methods need to be performed via cables which affects the circumferential beauty.

BRIEF DESCRIPTION OF THE DRAWINGS

FIG. 8 is the second flow chart of the wireless power transmission method of the present invention.

DESCRIPTION OF THE PREFERRED EMBODIMENTS

In order to make the examiners have a better understanding of the technical features, contents and advantages of the present invention as well as the effects capable of being achieved, the present invention will be explicitly described below via the presentation form of embodiments in coordination with the appending drawings, wherein the spirit of used drawings intends to present schematics of the present invention and assist with the specification, so that the contents of drawings are not necessarily the real proportions and precise configurations of the present invention. Therefore, the patent scope of practical employments of the present invention should not be confined by the proportions and configurations disclosed in the appended drawings.

The embodiments of the power supplying device, wireless power transmission system and the applied method thereof will be more explicitly described below via referring to the correlative figures. In order to make the description below easier to understand, the same components will be marked by the same symbols in the following embodiments so as to explicitly explain.

Figure 1:
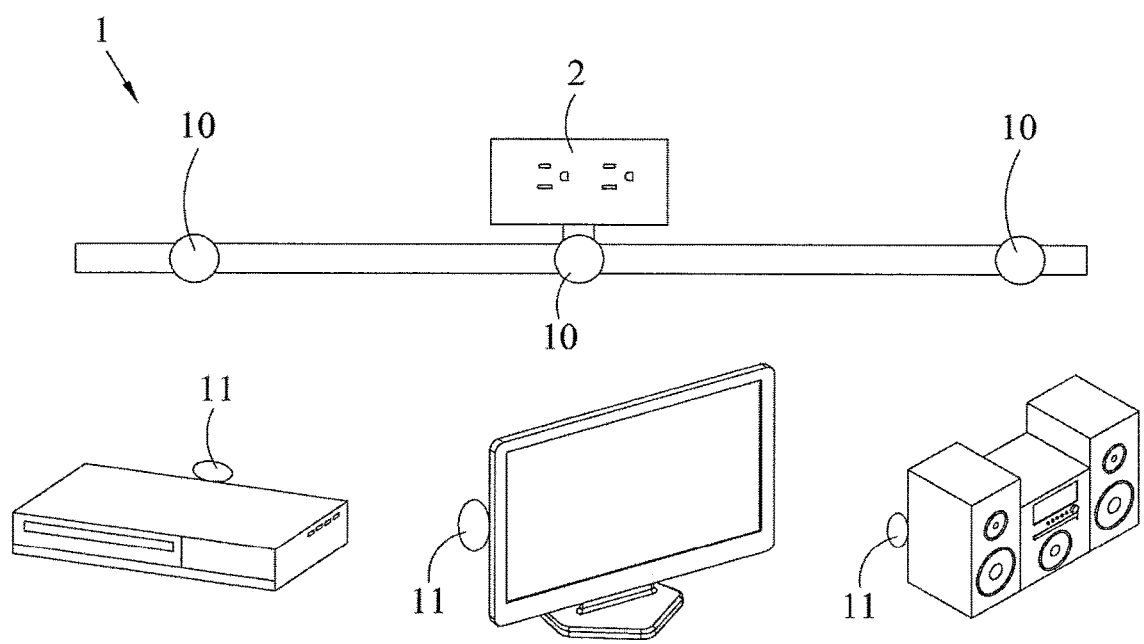
FIG. 1 is a schematic diagram showing the first embodiment of the wireless power transmission system of the present invention.
Figure 2:
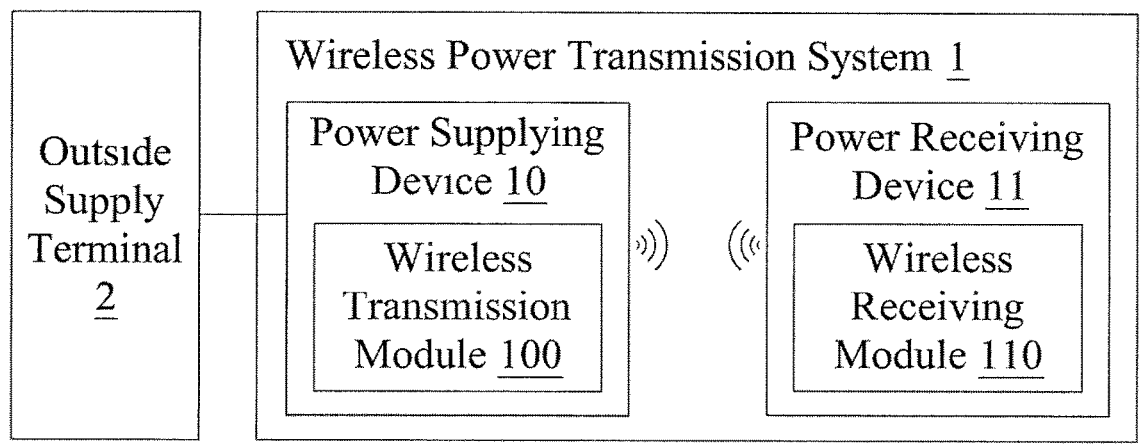
FIG. 2 is a block diagram showing the first embodiment of the wireless power transmission system of the present invention.

Please refer to FIG. 1 and FIG. 2, which are the schematic diagram and block diagram showing the first embodiment of the wireless power transmission system of the present invention, respectively. As illustrated in the figures, the wireless power transmission system 1 comprises at least one power supplying device 10 and at least one power receiving device 11. The at least one power supplying device 10 is electrically connected to the outside supply terminal 2, and having the wireless transmission module 100. The at least one power receiving device 11 has the wireless receiving module 110. Wherein when the wireless receiving module 110 is detected by the at least one power supplying device 10 via the wireless transmission module 100, the at least one power supplying device 10 is electrically and wirelessly connected to the wireless receiving module 110 via the wireless transmission module 100, and transmitting the electric power from the outside supply terminal 2 to the at least one power receiving device 11, or when the wireless transmission module 100 is detected by the at least one power receiving device 11 via the wireless receiving module 110, the at least one power receiving device 11 is electrically and wirelessly connected to the wireless transmission module 100 via the wireless receiving module 110, so as to receive the electric power transmitted by the at least one power supplying device 10.

Specifically, the wireless power transmission system 1 of the present invention comprises at least one power supplying device 10 and at least one power receiving device 11, wherein the at least one power supplying device 10 may be electrically connected to the outside supply terminal 2, such as inserting into the household socket or connecting to the portable power source, and have the wireless transmission module 100, which is capable of wirelessly transmitting the electric power and has the functions of infrared or radio frequency identification (RFID). On the other hand, the at least one power receiving device 11 may be configured in and electrically connected to the electric appliances (such as the televisions, refrigerators or stereos), wherein the at least one power receiving device 11 also has the wireless receiving module 110, which is capable of wirelessly receiving the electric power and has the functions of infrared, RFID and light detection and ranging (LIDAR) or any wireless detection technique.

As a result, during the operating procedure of the wireless power transmission system 1 of the present invention, the at least one power supplying device 10 may be controlled by the users so as to drive the wireless transmission module 100 to conduct a searching for whether there is any wireless receiving module 110 around, or may spontaneously drive the wireless transmission module 100 to conduct a searching for whether there is any wireless receiving module 110 around according to the presetting program stored therein. Oppositely, the at least one power receiving device 11 may also be controlled by the users so as to drive the wireless receiving module 110 to conduct a searching for whether there is any wireless transmission module 100 around, or may spontaneously drive the wireless receiving module 110 to conduct a searching for whether there is any wireless transmission module 100 around according to the presetting program stored therein.

When the wireless receiving module 110 is detected by the wireless transmission module 100 or the wireless transmission module 100 is detected by the wireless receiving module 110, the wireless transmission module 100 and the wireless receiving module 110 may establish a wireless electrical connection therebetween. Subsequently, the at least one power supplying device 10 may provide the electric power from the outside supply terminal 2 to the at least one power receiving device 11, so as to make the at least one power receiving device 11 able to provide the electric power to the electric appliances, and further drive the electric appliances to operate.

Thereby, via configuring the power supplying device 10 at the outside supply terminal 2 and configuring the power receiving device 11 at the electric appliances, the wireless transmission module 100 of the power supplying device 10 and the wireless receiving module 110 of the power receiving device 11 or combinations thereof may be utilized to conduct searching and detecting, and when the aforementioned modules are detected by each other, the wireless electrical connection would be established so as to supply the electric power, such that capable of achieving the convenience of power supplying and solving the problem that all the known power supplying methods need to be performed via cables which affects the circumferential beauty.

Figure 3:
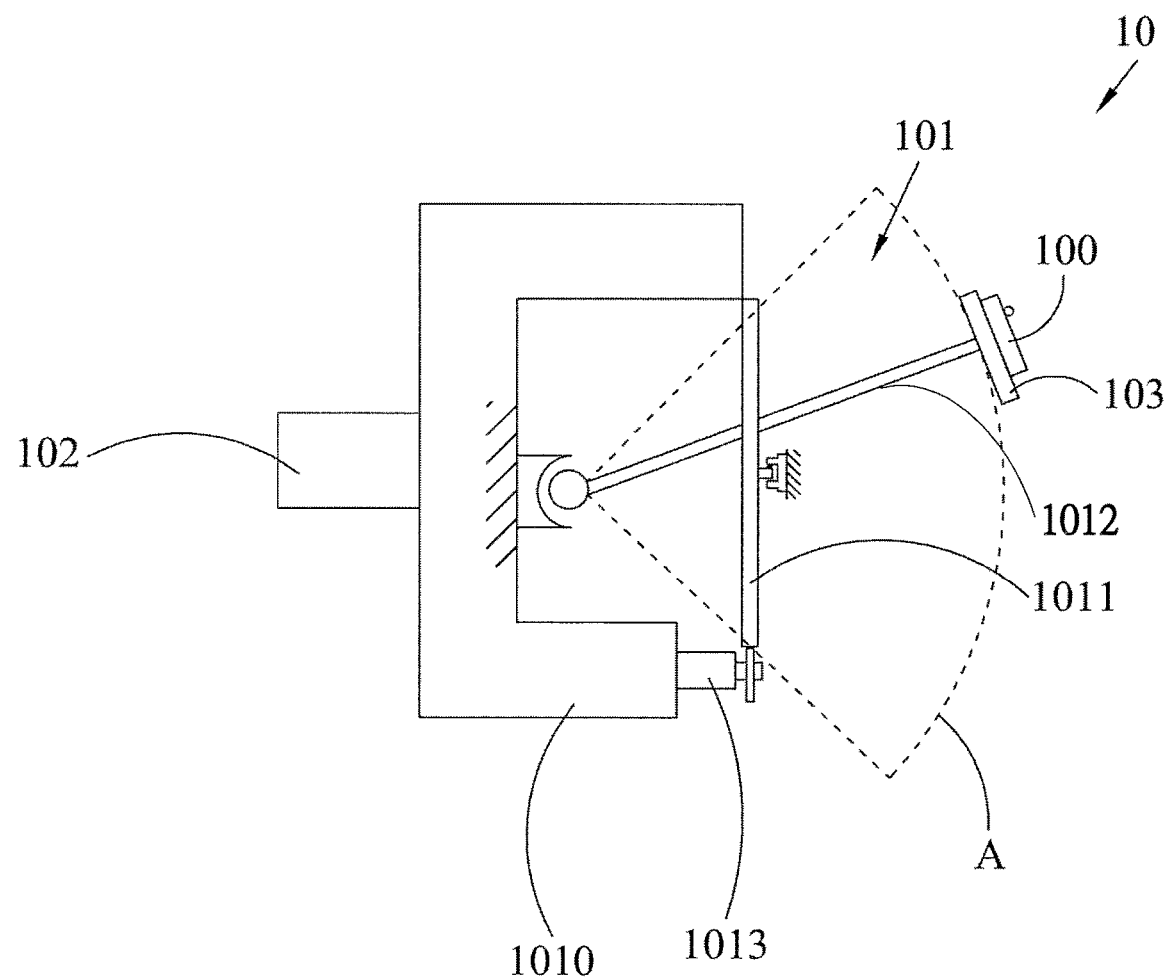
FIG. 3 is the first schematic diagram showing the first embodiment of the power supplying device of the present invention.
Figure 4:
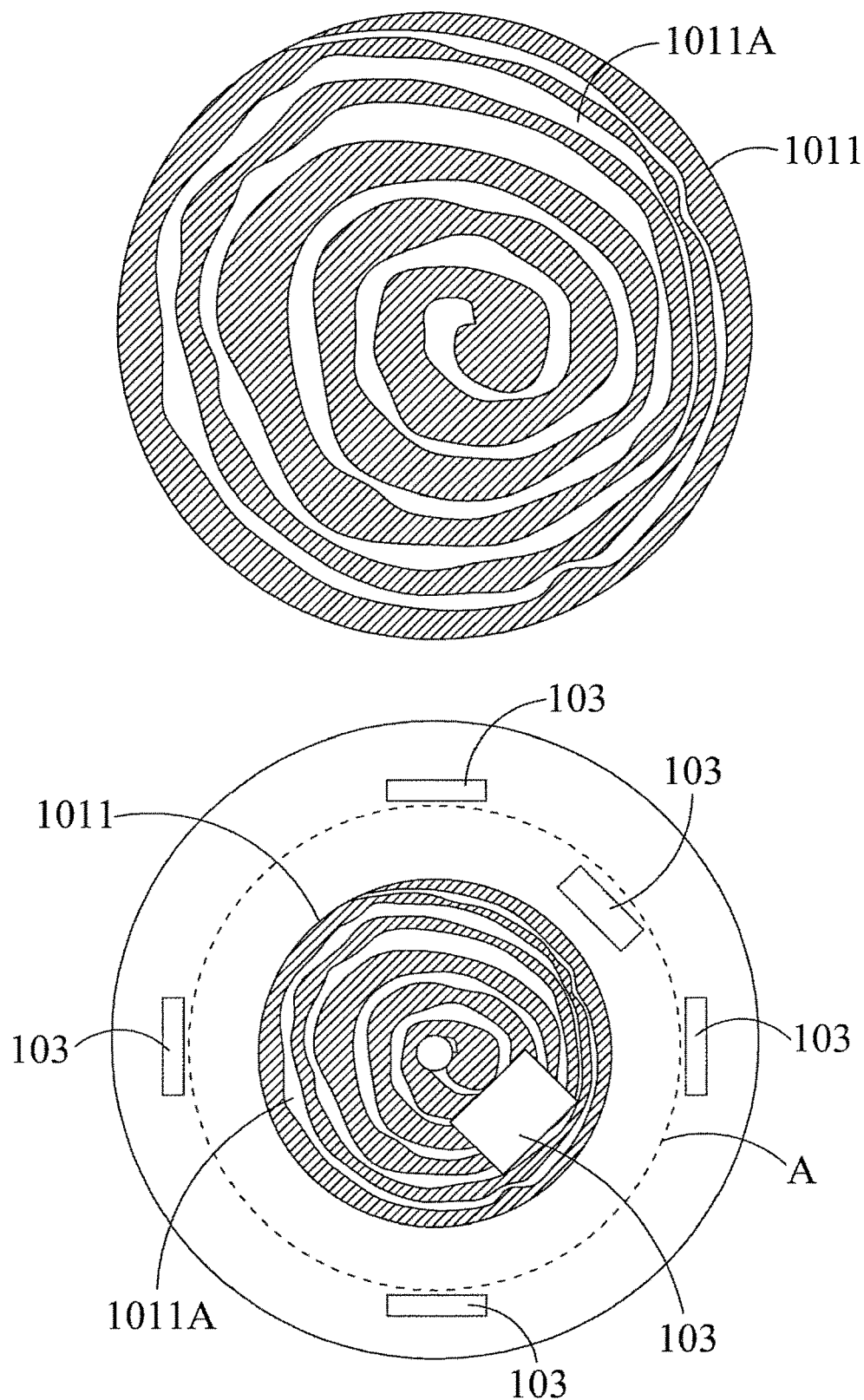
FIG. 4 is the second schematic diagram showing the first embodiment of the power supplying device of the present invention.
Figure 5:
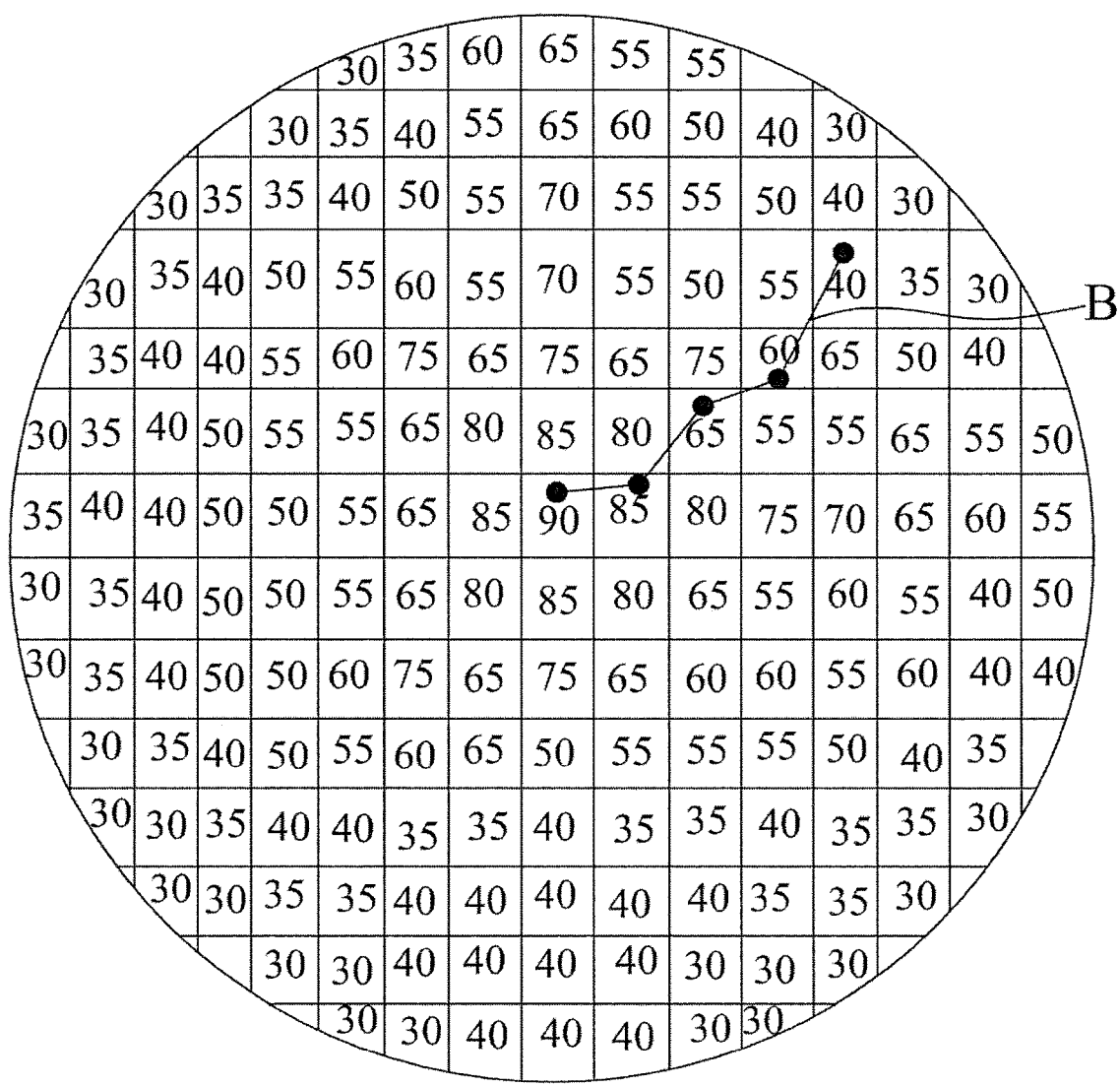
FIG. 5 is the third schematic diagram showing the first embodiment of the power supplying device of the present invention.

Please refer to FIG. 3 to FIG. 5 together with FIG. 1 and FIG. 2, which are the first to third schematic diagrams showing the first embodiment of the power supplying device of the present invention. As illustrated in these figures, the operating patterns of the same elements described in the power supplying device of the present embodiment and the wireless power transmission system of the first embodiment above are similar, so that the repetitive descriptions would be omitted herein. However, what is worth mentioning is that, in the present embodiment, the power supplying device 10 may comprise the driving module 101, power receiving module 102, wireless transmission module 100 and processing module 103. The power receiving module 102 is configured at the driving module 101, and receiving the electric power from the outside supply terminal 2. The wireless transmission module 100 detects the at least one power receiving device 11 within a predetermined range A. A processing module 103 is electrically connected to the power receiving module 102, the driving module 101 and the wireless transmission module 100, and making the driving module 101 drive the wireless transmission module 100 to conduct a displacement along a predetermined displacement trajectory. Wherein when the at least one power receiving device 11 is detected by the wireless transmission module 100 within the predetermined range A, the processing module 103 would accordingly control the wireless transmission module 100 to electrically and wirelessly connect to the at least one power receiving device 11, and subsequently, the electric power is transmitted to the at least one power receiving device 11 via the wireless transmission module 100.

For example, the power supplying device 10 of the present invention may further comprise the driving module 101, power receiving module 102, the wireless transmission module 100 and processing module 103. The power receiving module 102 is configured at the driving module 101, and capable of being electrically connected to the outside supply terminal 2 so as to receive the electric power provided by the outside supply terminal 2. The wireless transmission module 100 may wirelessly transmit the electric power and have the functions of infrared, RFID and LIDAR or any wireless detection technique. The processing module 103 may be the circuit board which may have the computing processor and memory for storing data, and electrically connected to the power receiving module 102, driving module 101 and wireless transmission module 100. Consequently, the processing module 103 may be controlled by the users or spontaneous according to the presetting program stored therein to make the driving module 101 drive the wireless transmission module 100 to conduct a displacement along a predetermined displacement trajectory within the predetermined range A (such as 1-3 meters) and a searching for whether there is any of the at least one power receiving device 11, and when the wireless receiving module 110 of the at least one power receiving device 11 is detected by the wireless transmission module 100, the processing module 103 may control the wireless transmission module 100 to electrically and wirelessly connect to the wireless receiving module 110 according to the detection result of the wireless transmission module 100, and the electric power is transmitted to the wireless receiving module 110 via the wireless transmission module 100.

Please further refer to FIG. 3 and FIG. 4, the driving module 101 of the present invention may preferably comprise an assembly main body 1010, a guiding assembly 1011, a linking-up assembly 1012 and a driving assembly 1013. One end of the assembly main body 1010 is connected to the power receiving module 102. The guiding assembly 1011 is suspended from the assembly main body 1010, and has at least one guiding groove 1011A. The linking-up assembly 1012 is interposed at the at least one guiding groove 1011A, wherein one end of the linking-up assembly 1012 can be movably connected to the other end of the assembly main body 1010, the other end of the linking-up assembly 1012 is connected to the processing module 103, and the wireless transmission module 100 is configured at the processing module 103. The driving assembly 1013 is electrically connected to the processing module 103, and movably connected to the outer edge of the guiding assembly 1011. Wherein the processing module 103 makes the driving assembly 1013 drive the guiding assembly 1011 to conduct a rotation, the linking-up assembly 1012 is subsequently moved along the predetermined displacement trajectory via the at least one guiding groove 1011A so as to drive the processing module 103 to conduct the displacement, and the wireless transmission module 100 is further driven to conduct the displacement in the predetermined range A and detect the at least one power receiving device 11. Besides, when the at least one power receiving device 11 is detected by the wireless transmission module 100, the processing module 103 would transmit the electric power to the at least one power receiving device 11 via the wireless transmission module 100.

Specifically, the driving module 101 may further comprise the assembly main body 1010, the guiding assembly 1011, the linking-up assembly 1012 and the driving assembly 1013. The assembly main body 1010 may be the base main body with any shape and structure. The power receiving module 102 may be configured on the assembly main body 1010, and electrically connected to the processing module 103. The guiding assembly 1011 may be the gear with spiral hollow structure (as illustrated in FIG. 4), which is suspended from the assembly main body 1010, and has the at least one guiding groove 1011A. The fixing method of fixing the guiding assembly 1011 on the assembly main body 1010 is a known technique, so that the description thereof is omitted herein. The linking-up assembly 1012 may be the bar-shaped structure, which is interposed at the at least one guiding groove 1011A, wherein both the main body of the linking-up assembly 1012 and the at least one guiding groove 1011A may be configured with the teeth so as to connect with each other via mutually clenching manner. Besides, one end of the linking-up assembly 1012 may be movably connected to the assembly main body 1010, wherein the assembly main body 1010 may have an universal joint thereon, so as to movably connect with the linking-up assembly 1012, while the other end of the linking-up assembly 1012 may be configured with the processing module 103, on which the wireless transmission module 100 may be configured. In addition, the driving assembly 1013 may be the servo motor or stepping motor, which may be electrically connected to the processing module 103 and movably connected to the outer edge of the guiding assembly 1011, wherein one end of the driving assembly 1013 may be configured with the gear, the outer edge of the guiding assembly 1011 may be configured with the teeth, such that the driving assembly 1013 may clench the outer edge of the guiding assembly 1011 via the gear.

Therefore, when the processing module 103 is controlled by the users or spontaneous according to the presetting program stored therein to conduct the action of searching and detecting, the processing module 103 would make the driving assembly 1013 drive the guiding assembly 1011 to conduct a rotation, such that the guiding assembly 1011 may move the linking-up assembly 1012 along the predetermined displacement trajectory via the at least one guiding groove 1011A so as to drive the processing module 103 to conduct the displacement. On the other hand, when the processing module 103 conducts the displacement (as illustrated in FIG. 4), the wireless transmission module 100 would follow the processing module 103 to conduct the displacement, so as to subsequently drive the wireless transmission module 100 to move within the predetermined range A and conduct the searching as well as detecting for whether there is any of the at least one power receiving device 11. Subsequently, when the at least one power receiving device 11 is detected by the wireless transmission module 100, the processing module 103 would transmit the electric power to the at least one power receiving device 11 via the wireless transmission module 100.

What is worth mentioning is that the processing module 103 may make the driving module 101 drive the wireless transmission module 100, in order to conduct the searching and detecting, along a predetermined displacement trajectory B within a predetermined range A according to the user control or presetting program, so as to transfer the predetermined range A into the two-dimensional plane coordinates and divide the two-dimensional plane coordinates into four quadrants. When or after the driving module 101 drives the wireless transmission module 100 to conduct the gradual searching within the predetermined range A, the signal strength values corresponding to each coordinate point may be generated (i.e., the signal strength distribution diagram as illustrated in FIG. 5, which corresponds to the predetermined range A), so as to make the processing module 103 judge whether the wireless transmission module 110 is searched or detected. Hence, when the highest signal strength value occurs within the predetermined range A, that coordinate point would be judged as the position of the power receiving device 11, which is the closest position adjacent the power receiving device 11. Subsequently, the processing module 103 would make the driving module 101 drive the wireless transmission module 100 to move to the position of that coordinate point, so as to conduct the wireless electrical connection with the power receiving device 11. Wherein the processing module 103 may store the signal strength distribution diagram, and store a new signal strength distribution diagram after conducting an updating thereof in a predetermined period such as 1, 5 or 10 minutes. Besides, the processing module 103 may promptly modify the predetermined displacement trajectory of the driving module 101 driving the wireless transmission module 100 according to the signal strength distribution diagram before or after updating, but not limited thereto. The predetermined displacement trajectory described above may be the displacement of the driving module 101 driving the wireless transmission module 100 via a stepping manner and a manner of four-square division or nine-square division (as illustrated in FIG. 5, the predetermined displacement trajectory B). Besides, the predetermined range may be 1 to 3 meters, but not limited thereto. That is, the predetermined range may be adjusted according to the user setting or the setting of the processing module 103 based on the program.

In addition, the specific structure of the at least one power receiving device 10 may be equivalent to that of the at least one power supplying device 10, or lack the driving module 101 in comparison with the at least one power supplying device 10. Thus, regarding the wireless power transmission system 1 of the present invention, the structure of the at least one power receiving device 11 therein is not specifically described.

Please refer to FIG. 1 to FIG. 5 again, the wireless power transmission system of the present invention further proposes a second embodiment, in which the operating patterns of the same elements described in the wireless power transmission system and power supplying device of the aforementioned embodiments are similar, so that the repetitive descriptions would be omitted herein. However, what is worth mentioning is that, in the present embodiment, when the wireless receiving module 110 is detected by the wireless transmission module 100 or the wireless transmission module 100 is detected by the wireless receiving module 110, and the at least one power supplying device 10 judges the at least one power receiving device 11 as conforming to a certification procedure, the at least one power supplying device 10 is electrically and wirelessly connected to the wireless receiving module 110 via the wireless transmission module 100, so as to transmit the electric power from the outside supply terminal 2 to the at least one power receiving device 11.

Specifically, when the wireless receiving module 110 is detected by the wireless transmission module 100 through the infrared detecting manner which is driven by the driving module 101 moved by the processing module 103 along the predetermined displacement trajectory within the predetermined range, or the wireless transmission module 100 is detected by the wireless receiving module 110 of the at least one power receiving device 11 via the infrared detecting manner, the at least one power receiving device 11 would transmit a device identification code (such as serial numbers) to the wireless transmission module 100 via the wireless receiving module 110. And then, if the processing module 103 judges the device identification code as conforming to the serial number in the device list, the processing module 103 would control the wireless transmission module 100 to establish a wireless electrical connection with the wireless receiving module 110, and transmitting the electric power to the at least one power receiving device 11.

Please refer to FIG. 1 to FIG. 5 again, the wireless power transmission system of the present invention further proposes a third embodiment, in which the operating patterns of the same elements described in the wireless power transmission system and power supplying device of the aforementioned embodiments are similar, so that the repetitive descriptions would be omitted herein. However, what is worth mentioning is that, in the present embodiment, when the wireless receiving module 110 is detected by the wireless transmission module 100 or the wireless transmission module 100 is detected by the wireless receiving module 110, and the wireless transmission module 100 receives the request signal transmitted by the wireless receiving module 110, the at least one power supplying device 10 would accordingly conduct the positioning operation, and electrically and wirelessly connected to the wireless receiving module 110 via the wireless transmission module 100, so as to transmit a predetermined electric power to the at least one power receiving device 11.

Specifically, when the processing module 103 of the at least one power supplying device 10 makes the driving module 101 drive the wireless transmission module 100 along the predetermined displacement trajectory to detect the wireless receiving module 110 through the RFID manner within the predetermined range, whether there is a wireless communication response of the wireless receiving module 110 would be detected, wherein if the response described above occurs, the processing module 103 would further recognize whether the wireless receiving module 110 is the acknowledged device (as the recognizing manner of the embodiments described above, so that the repetitive description thereof is omitted herein). Once the processing module 103 judges the wireless receiving module 110 as the acknowledged device, the wireless transmission module 100 and the wireless receiving module 110 would establish a wireless communication connection therebetween, and the wireless transmission module 100 would receive the request signal transmitted by the wireless receiving module 110, wherein the request signal may be the signal strength currently received by the at least one power receiving device 11 and electric power demand. And then, according to the signal of the signal strength of the at least one power receiving device 11, the processing module 103 may make the driving module 101 drive the wireless transmission module 100 to move to the position where the communication with the wireless receiving module 110 has the best quality, and control the wireless transmission module 100 to establish a wireless electrical connection with the wireless receiving module 110. Eventually, the predetermined electric power is transmitted to the at least one power receiving device 11 via the wireless transmission module 100, wherein the predetermined electric power may be determined according to the signal of the electric power demand of the at least one power receiving device 11. That is, after the wireless electrical connection between the power receiving device 11 and the power supplying device 10 is established, the power receiving device 11 may transmit the signal of the electric power demand to the power supplying device 10 before or during transmission of the electric power by the power supplying device 10, so as to make the power supplying device 10 able to promptly adjust the transmitted electric power.

Oppositely, the at least one power receiving device 11 may detect whether there is any request signal transmitted by the wireless transmission module 100 via the wireless receiving module 110, and if the request signal occurs, the at least one power receiving device 11 would conduct a certification procedure with the at least one power supplying device 10. After the certification procedure is completed, the request signal would be transmitted to the at least one power supplying device 10, so as to proceed the following power supply procedures (as described above).

Please refer to FIG. 1 to FIG. 5, the wireless power transmission system of the present invention further proposes a fourth embodiment, in which the operating patterns of the same elements described in the wireless power transmission system and power supplying device of the aforementioned embodiments are similar, so that the repetitive descriptions would be omitted herein. However, what is worth mentioning is that, in the present embodiment, when the wireless receiving module 110 is detected by the wireless transmission module 100 or the wireless transmission module 100 is detected by the wireless receiving module 110, and the wireless transmission module 100 receives the request signal transmitted by the wireless receiving module 110, the at least one power supplying device 10 would accordingly generate a control signal, and transmit the control signal to the wireless receiving module 110, so as to make the at least one power receiving device 11 conduct a displacement operation according to the control signal, and make the at least one power supplying device 10 conduct a positioning operation according to the request signal, wherein the at least one power supplying device 10 is electrically and wirelessly connected to the wireless receiving module 110 via the wireless transmission module 100, so as to transmit the predetermined electric power to the at least one power receiving device 11.

Specifically, the difference between the present embodiment and the third embodiment described above lies in that the at least one power receiving device 11 here is capable of conducting the positioning operation. That is, after the processing module 103 of the at least one power supplying device 10 establishes a wireless communication connection with the wireless receiving module 110 via the wireless transmission module 100 and receives the request signal (including the signal strength and electric power demand) transmitted by the wireless receiving module 110, the processing module 103 may generate a control signal of position adjustment according to the signal of the signal strength of the at least one power receiving device 11 and the prompt signal strength distribution diagram, and transmit the control signal to the at least one power receiving device 11 via the wireless transmission module 100. And then, the at least one power receiving device 11 may adjust the position of the wireless receiving module 110 according to the control signal; in the meanwhile, the processing module 103 also makes the driving module 101 drive the wireless transmission module 100 move to the position where the communication with the wireless receiving module 110 has the best quality. Subsequently, the wireless transmission module 100 is controlled to establish a wireless electrical connection with the wireless receiving module 110, and the predetermined electric power is transmitted to the at least one power receiving device 11 via the wireless transmission module 100.

Oppositely, the at least one power receiving device 11 may detect whether there is any request signal transmitted by the wireless transmission module 100 via the wireless receiving module 110, and if the request signal occurs, the at least one power receiving device 11 would conduct a certification procedure with the at least one power supplying device 10. After the certification procedure is completed, the request signal would be transmitted to the at least one power supplying device 10, and the control signal transmitted by the at least one power supplying device 10 would be received by the power receiving device 11 to conduct a positioning of the wireless receiving module 110, so as to proceed the following power supply procedures (as described above).

Besides, in each embodiment described above, the driving module 101 of the present invention may also be the spherical motor, which can be used to make the wireless transmission module 100 conduct a displacement, wherein the specific employment is the same as descriptions above, so that the repetitive description is omitted herein, but the specific employment is not limited to the stepping manner via four-square division or nine-square division as described above.

Figure 6:
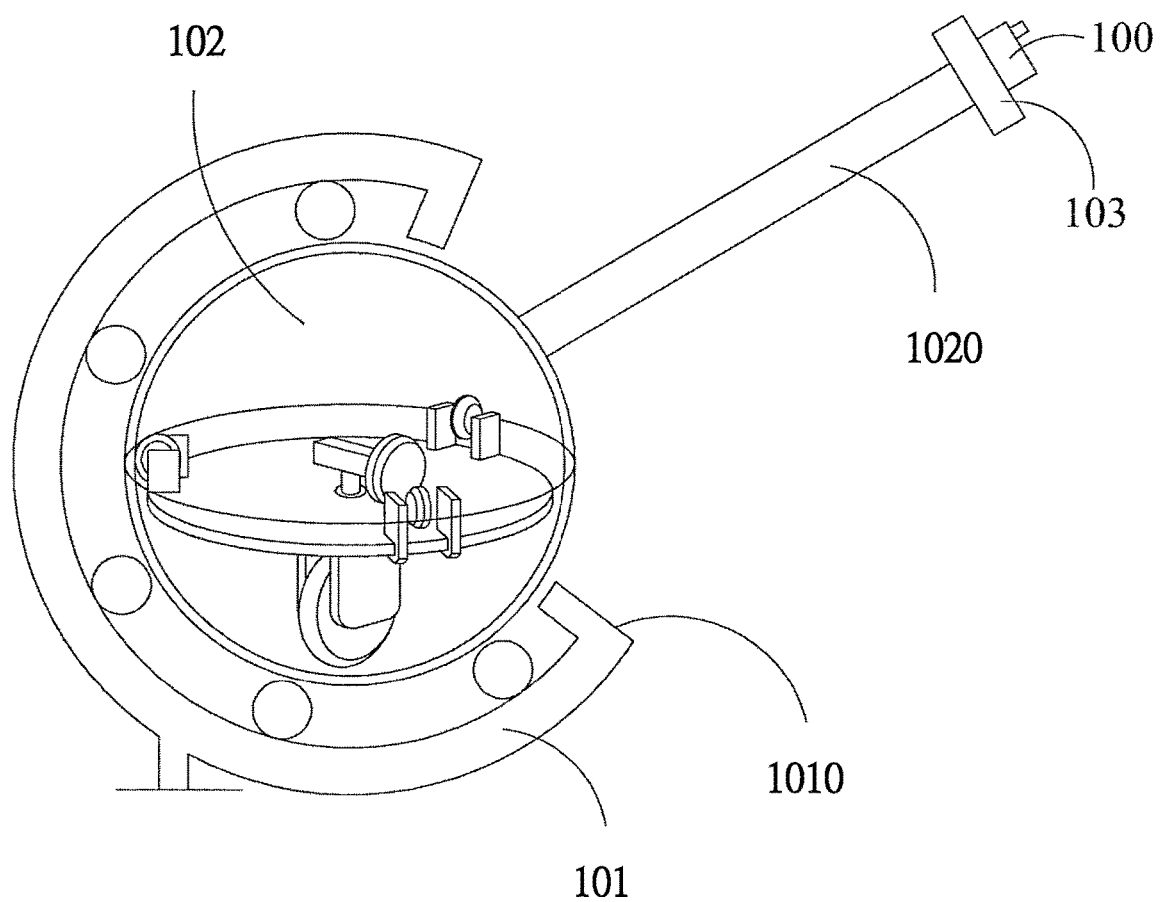
FIG. 6 is the schematic diagram showing the second embodiment of the power supplying device of the present invention.

Please refer to FIG. 6 together with FIG. 1 to FIG. 5, which is the schematic diagram showing the second embodiment of the power supplying device of the present invention. As illustrated in the figures, in comparison with the power supplying device of the present embodiment, the operating patterns of the same elements described in the power supplying device of the first embodiment described above are similar, so that the repetitive descriptions would be omitted herein. However, what is worth mentioning is that, in the present embodiment, the power supplying device 10 may comprise a wireless transmission module 100, a device main body 101, a driving module 102 and a processing module 103. The device main body may be the casing structure and has an opening 1010. The driving module 102 may be movably configured in the device main body 101, wherein the driving module 102 may be the spherical motor and electrically connected to the outside supply terminal 2 to receive the electric power thereof. Besides, the driving module 102 has a linking-up member 1020 which is bar-shaped, wherein one end of the linking-up member 1020 is connected to the driving module 102, and the other end of the linking-up member 1020 is connected to the processing module 103. The processing module 103 may be the circuit board which may have the computing processor and memory for storing data, configured with the wireless transmission module 100 thereon, and electrically connected to the wireless transmission module 100 and the driving module 102. The wireless transmission module 100 is capable of wirelessly transmitting the electric power and has the functions of infrared, RFID and LIDAR or any wireless detection technique. Consequently, the processing module 103 may be controlled by the users or spontaneous according to the presetting program stored therein to make the driving module 102 drive the wireless transmission module 100 to conduct a displacement along a predetermined displacement trajectory within the predetermined range A (such as 1-3 meters) and a searching as well as a detecting for whether there is any of the at least one power receiving device 11, and when the wireless receiving module 110 of the at least one power receiving device 11 is detected by the wireless transmission module 100, the processing module 103 may control the wireless transmission module 100 to electrically and wirelessly connect to the wireless receiving module 110 according to the detection result of the wireless transmission module 100, and the electric power is transmitted to the wireless receiving module 110 via the wireless transmission module 100.

Although the concept of the wireless power transmission method of the present invention has been simultaneously explained during the explanation of the wireless power transmission system described above, in order to present a more explicit explanation, the step flow charts are further depicted for detailed descriptions as follows.

Figure 7:
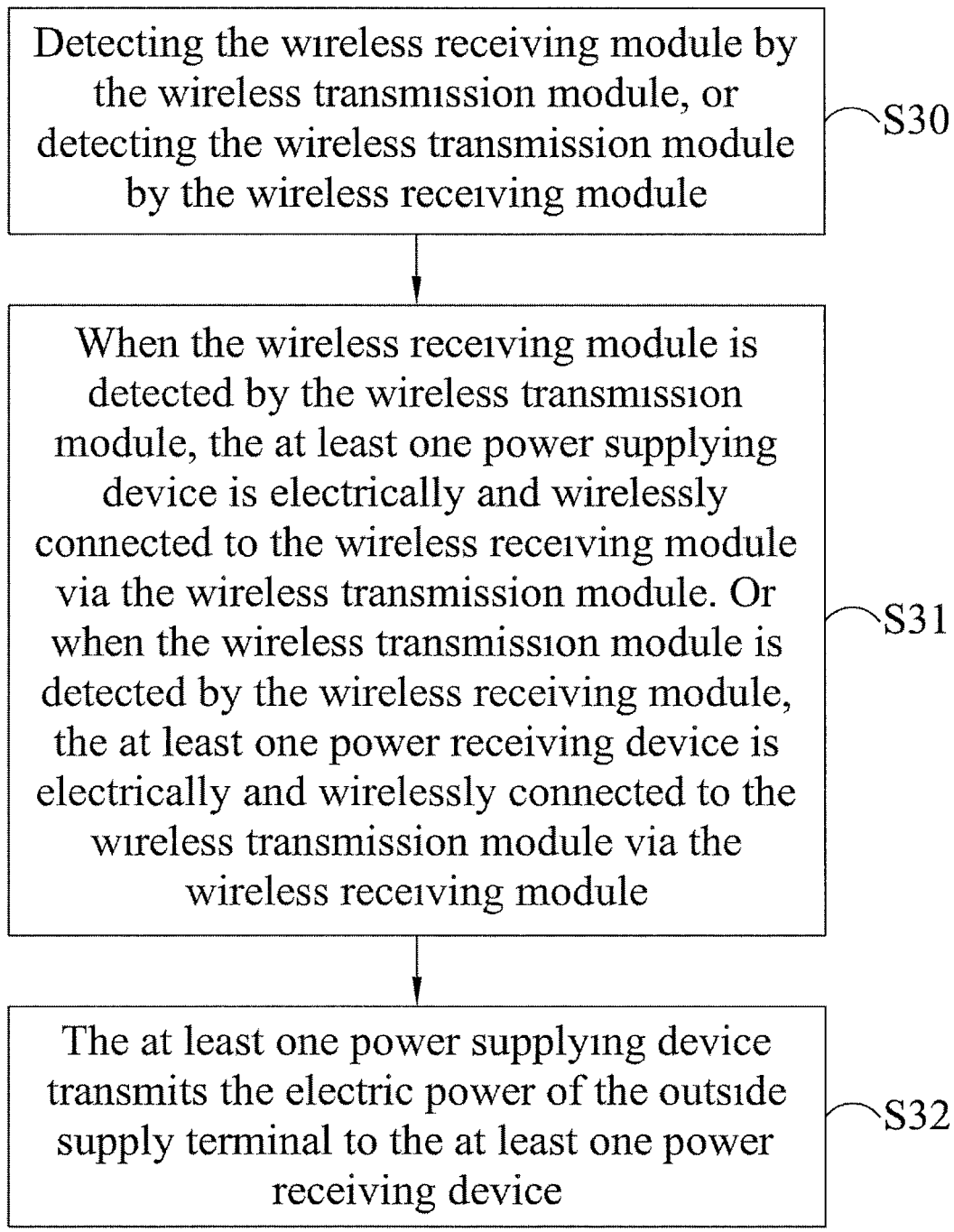
FIG. 7 is the first flow chart of the wireless power transmission method of the present invention.

Please refer to FIG. 7 together with FIG. 1 to FIG. 6, which is the first flow chart of the wireless power transmission method of the present invention. As illustrated in the figures, the wireless power transmission method of the present invention may comprise the following steps:

The step S30: detecting the wireless receiving module via the wireless transmission module, or detecting the wireless transmission module via the wireless receiving module.

The step S31: when the wireless receiving module is detected via the wireless transmission module, the at least one power supplying device is electrically and wirelessly connected to the wireless receiving module via the wireless transmission module; or, when the wireless transmission module is detected via the wireless receiving module, the at least one power receiving device is electrically and wirelessly connected to the wireless transmission module via the wireless receiving module; and The step S32: the at least one power supplying device transmits the electric power from the outside supply terminal to the at least one power receiving device.

Please refer to FIG. 8 together with FIG. 1 to FIG. 6, which is the second flow chart of the wireless power transmission method of the present invention, wherein the repetitive description is omitted herein. However, what is worth mentioning is that, in the present embodiment, the step that the wireless receiving module is detected by the wireless transmission module or the wireless transmission module is detected by the wireless receiving module may preferably and further comprise steps as follows:

The step S31A: when the at least one power receiving device is judged as conforming to the certification procedure via the at least one power supplying device, the at least one power supplying device is electrically and wirelessly connected to the wireless receiving module via the wireless transmission module, so as to transmit the electric power from the outside supply terminal to the at least one power receiving device.

Figure 9:
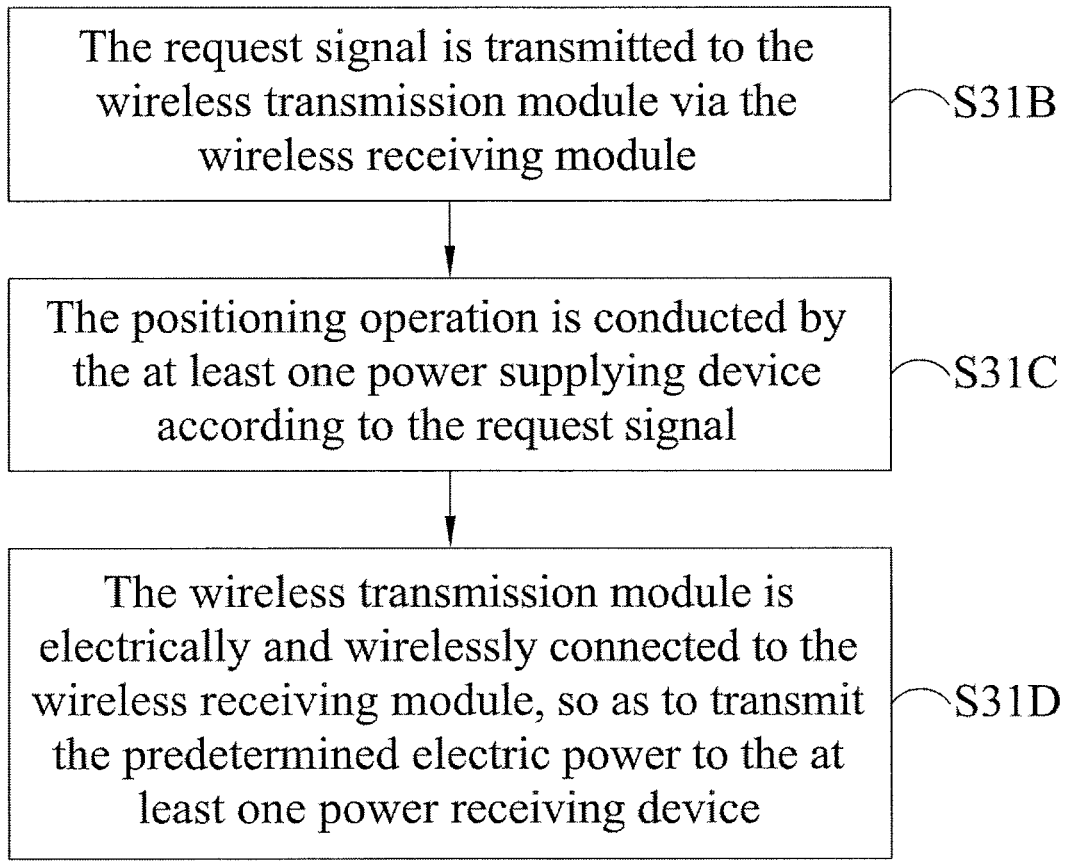
FIG. 9 is the third flow chart of the wireless power transmission method of the present invention.

Please refer to FIG. 9 together with FIG. 1 to FIG. 6, which is the third flow chart of the wireless power transmission method of the present invention, wherein the repetitive description is omitted herein. However, what is worth mentioning is that, in the present embodiment, the step that the wireless receiving module is detected by the wireless transmission module or the wireless transmission module is detected by the wireless receiving module may preferably and further comprise steps as follows:

The step S31B: the request signal is transmitted to the wireless transmission module via the wireless receiving module;

The step S31C: the positioning operation is conducted via the at least one power supplying device according to the request signal; and The step S31D: the wireless transmission module is electrically and wirelessly connected to the wireless receiving module, so as to transmit the predetermined electric power to the at least one power receiving device.

Figure 10:
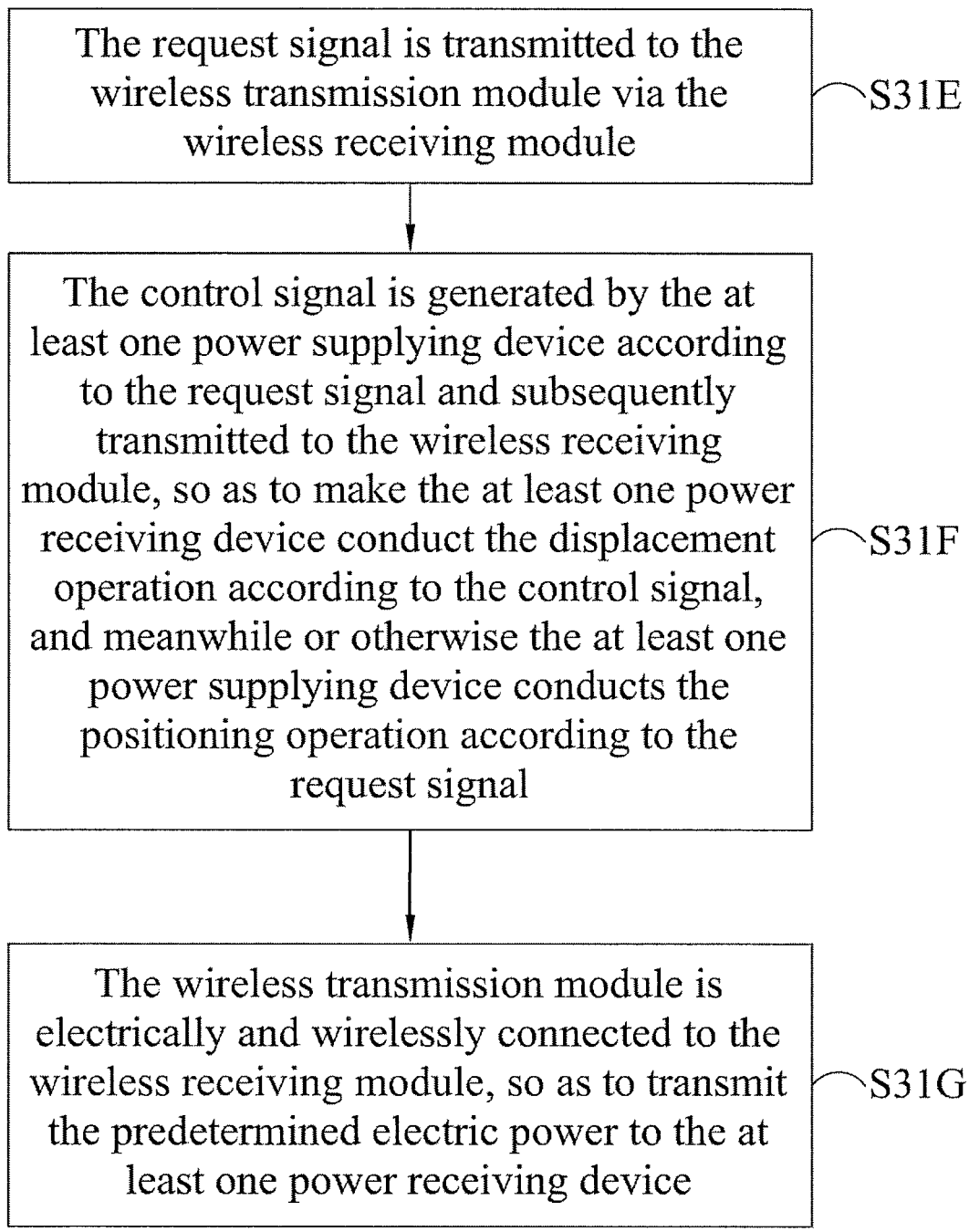
FIG. 10 is the fourth flow chart of the wireless power transmission method of the present invention.

Please refer to FIG. 10 together with FIG. 1 to FIG. 6, which is the fourth flow chart of the wireless power transmission method of the present invention, wherein the repetitive description is omitted herein. However, what is worth mentioning is that, in the present embodiment, the step that the wireless receiving module is detected by the wireless transmission module or the wireless transmission module is detected by the wireless receiving module may preferably and further comprise steps as follows:

The step S31E: the request signal is transmitted to the wireless transmission module via the wireless receiving module;

The step S31F: the control signal is generated via the at least one power supplying device according to the request signal and subsequently transmitted to the wireless receiving module, so as to make the at least one power receiving device conduct the displacement operation according to the control signal and utilize the at least one power supplying device to conduct the positioning operation according to the request signal; and The step S31G: the wireless transmission module is electrically and wirelessly connected to the wireless receiving module, so as to transmit the predetermined electric power to the at least one power receiving device.

The description above is merely for exemplification rather than limitation of the present invention. Therefore, any equivalent modification or changing performed to the present invention without departing from the spirit and scope defined by the present invention should be included in the appending claims below.

What is claimed is:

1. A wireless power transmission system, comprising:
at least one power supplying device, electrically connected to an outside supply terminal, and comprising:
a driving module comprising an assembly main body, a guiding assembly, a linking-up assembly and a driving assembly, the guiding assembly being suspended from the assembly main body and having at least one guiding groove, the linking-up assembly being interposed at the at least one guiding groove and being connected to the assembly main body, and the driving assembly being movably connected to the outer edge of the guiding assembly; a power receiving module, located at the driving module, and receiving electric power from the outside supply terminal, the assembly main body being connected to the power receiving module;
a wireless transmission module, searching for and detecting the wireless receiving module within a predetermined range; and
a processing module, electrically connected to the power receiving module, the driving module and the wireless transmission module, and making the driving module drive the wireless transmission module to conduct a displacement along a predetermined displacement trajectory;

at least one power receiving device comprising a variety of household electric appliances, having a wireless receiving module;

wherein the driving module drives the wireless transmission module to conduct a gradual searching within a predetermined range and signal strength values corresponding to each coordinate point are generated, when a highest signal strength value occurs within the predetermined range, a coordinate point corresponded to the highest signal strength value is judged as a position of the at least one power receiving device;

wherein, when the wireless receiving module is detected by the at least one power supplying device via the wireless transmission module, the at least one power supplying device is electrically and wirelessly connected to the wireless receiving module via the wireless transmission module, and transmits electric power from the outside supply terminal to the at least one power receiving device.

2. The wireless power transmission system of claim 1, wherein the wireless receiving module detected by the wireless transmission module or the wireless transmission module detected by the wireless receiving module further comprises: the at least one power receiving device is judged as conforming to a certification procedure by the at least one power supplying device.

3. The wireless power transmission system of claim 1, wherein when the wireless receiving module is detected by the wireless transmission module or the wireless transmission module is detected by the wireless receiving module, and the wireless transmission module receives a request signal transmitted by the wireless receiving module, the at least one power supplying device conducts a positioning operation according to the request signal, wherein the driving module drives the wireless transmission module to move to the position where the position of the at least one power receiving device has best communication quality, and electrically and wirelessly connects to the wireless receiving module via the wireless transmission module, so as to transmit a predetermined electric power to the at least one power receiving device.

4. The wireless power transmission system of claim 1, wherein the power receiving device comprises:

a driving module;

the wireless receiving module, searching for and detecting the wireless transmission module within a predetermined range; and a processing module, electrically connected to the driving module and wireless receiving module, and making the driving module drive the wireless receiving module to conduct a displacement operation;

wherein when the wireless receiving module is detected by the wireless transmission module or the wireless transmission module is detected by the wireless receiving module, and the wireless transmission module receives a request signal transmitted by the wireless receiving module, the at least one power supplying device generates a control signal according to the request signal, and transmits the control signal to the wireless receiving module, so as to make the at least one power receiving device conduct the displacement operation according to the control signal, wherein the at least one power receiving device adjusts a position of the wireless receiving module, and meanwhile the at least one power supplying device conducts a positioning operation according to the request signal, the driving module drives the wireless transmission module to move to the position where the position of the at least one power receiving device has best communication quality; and then the at least one power supplying device is electrically and wirelessly connected to the wireless receiving module via the wireless transmission module, so as to transmit a predetermined electric power to the at least one power receiving device.

5. The wireless power transmission system of claim 1, wherein when the wireless receiving module is detected by the wireless transmission module within the predetermined range, the processing module accordingly controls the wireless transmission module to electrically and wirelessly connect to the wireless receiving module, and subsequently, electric power is transmitted to the wireless receiving module via the wireless transmission module.

6. A wireless power transmission method, the wireless power transmission method comprising steps as follows:

detecting a wireless receiving module of at least one power receiving device by a wireless transmission module of at least one power supplying device;

conducting a gradual searching within a predetermined range by the wireless transmission module to generate signal strength values corresponding to each coordinate point and judging a position of the at least one power receiving device by a highest signal strength value occurred within the predetermined range;

when the wireless receiving module is detected by the wireless transmission module, the at least one power supplying device is electrically and wirelessly connected to the wireless receiving module via the wireless transmission module; and the at least one power supplying device transmits electric power from the outside supply terminal to the at least one power receiving device;

wherein a processing module makes a driving assembly drive a guiding assembly to conduct a rotation, a linking-up assembly is subsequently moved along the predetermined displacement trajectory via at least one guiding groove so as to drive the processing module to conduct the displacement, and the wireless transmission module is further driven to conduct the displacement in the predetermined range and detect the at least one power receiving device.

7. The wireless power transmission method of claim 6, wherein the step in which the wireless receiving module is detected by the wireless transmission module or the wireless transmission module is detected by the wireless receiving module further comprises a step as follows:

the at least one power receiving device is judged as conforming to a certification procedure by the at least one power supplying device.

8. The wireless power transmission method of claim 6, wherein the step in which the wireless receiving module is detected by the wireless transmission module or the wireless transmission module is detected by the wireless receiving module further comprises steps as follows:

a request signal from the wireless receiving module is transmitted to the wireless transmission module;

a positioning operation is conducted by the at least one power supplying device according to the request signal, a driving module drives the wireless transmission module to move to the position where the position of the at least one power receiving device has best communication quality; and the wireless receiving module is electrically and wirelessly connected to the wireless transmission module, so as to transmit a predetermined electric power to the at least one power receiving device.

9. The wireless power transmission method of claim 6, wherein the step in which the wireless receiving module is detected by the wireless transmission module or the wireless transmission module is detected by the wireless receiving module further comprises steps as follows:

a request signal from the wireless receiving module is transmitted to the wireless transmission module;

a control signal is generated by the at least one power supplying device according to the request signal and transmitted to the wireless receiving module, so as to make the at least one power receiving device conduct a displacement operation according to the control signal, the at least one power receiving device adjusts a position of the wireless receiving module, and meanwhile or otherwise the at least one power supplying device conducts a positioning operation according to the request signal, a driving module drives the wireless transmission module to move to the position where the position of the at least one power receiving device has best communication quality; and the wireless transmission module electrically and wirelessly connects to the wireless receiving module, so as to transmit a predetermined electric power to the at least one power receiving device.

10. A power supplying device, comprising:

a driving module comprising:

an assembly main body, one end of which is connected to the power receiving module;

a guiding assembly, suspended from the assembly main body, and having at least one guiding groove;

a linking-up assembly, interposed at the at least one guiding groove, wherein one end of the linking-up assembly is movably connected to the other end of the assembly main body, the other end of the linking-up assembly is connected to the processing module, and the wireless transmission module is located at the processing module; and a driving assembly, electrically connected to the processing module, and movably connected to an outer edge of the guiding assembly;

a power receiving module, located at the driving module, and receiving electric power from an outside supply terminal;

a wireless transmission module, the driving module driving the wireless transmission module to conduct a gradual searching within the predetermined range and signal strength values corresponding to each coordinate point are generated, when a highest signal strength value occurs within the predetermined range, a coordinate point corresponded to the highest signal strength value is judged as a position of at least one power receiving device; and a processing module, electrically connected to the power receiving module, the driving module and the wireless transmission module, and making the driving module drive the wireless transmission module to conduct a displacement along a predetermined displacement trajectory;

wherein when the at least one power receiving device is detected by the wireless transmission module within the predetermined range, the processing module accordingly controls the wireless transmission module to electrically and wirelessly connect to the at least one power receiving device, and subsequently, electric power is transmitted to the at least one power receiving device via the wireless transmission module.

11. The power supplying device of claim 10, wherein the processing module makes the driving assembly drive the guiding assembly to conduct a rotation, the linking-up assembly is subsequently moved along the predetermined displacement trajectory via the at least one guiding groove so as to drive the processing module to conduct the displacement, and the wireless transmission module is further driven to conduct the displacement in the predetermined range and detect the at least one power receiving device; besides, when the at least one power receiving device is detected by the wireless transmission module, the processing module transmits electric power to the at least one power receiving device via the wireless transmission module.

* * * * *